(12) United States Patent
Chefd'hotel et al.

(10) Patent No.: US 8,498,459 B2
(45) Date of Patent: Jul. 30, 2013

(54) SYSTEM AND METHOD FOR VERIFYING REGISTRATION ACCURACY IN DIGITAL MEDICAL IMAGES

(75) Inventors: Christophe Chefd'hotel, Jersey City, NJ (US); Benjamin L. Odry, West New York, NJ (US)

(73) Assignee: Siemens Aktiengesellschaft, Munich (DE)

( * ) Notice: Subject to any disclaimer, the term of this patent is extended or adjusted under 35 U.S.C. 154(b) by 422 days.

(21) Appl. No.: 12/897,845

(22) Filed: Oct. 5, 2010

(65) Prior Publication Data

US 2011/0085716 A1    Apr. 14, 2011

Related U.S. Application Data

(60) Provisional application No. 61/249,740, filed on Oct. 8, 2009.

(51) Int. Cl.
*G06K 9/00* (2006.01)

(52) U.S. Cl.
USPC .......................................... 382/128; 382/294

(58) Field of Classification Search
None
See application file for complete search history.

(56) References Cited

U.S. PATENT DOCUMENTS

| | | | | |
|---|---|---|---|---|
| 5,937,083 | A * | 8/1999 | Ostuni | 382/131 |
| 7,286,694 | B2 * | 10/2007 | Oosawa | 382/128 |
| 7,362,920 | B2 * | 4/2008 | Xu et al. | 382/294 |
| 7,536,644 | B2 * | 5/2009 | Fowkes et al. | 715/720 |
| 8,345,943 | B2 * | 1/2013 | Neemuchwala et al. | 382/130 |

OTHER PUBLICATIONS

Hill, Derek LG, et al. "Medical image registration." Physics in medicine and biology 46.3 (2001): R1-R45.*
Zitova, Barbara, and Jan Flusser. "Image registration methods: a survey." Image and vision computing 21.11 (2003): 977-1000.*

* cited by examiner

*Primary Examiner* — Shefali Goradia
(74) *Attorney, Agent, or Firm* — Donald B. Paschburg

(57) ABSTRACT

A method of verifying a registration of a digital image includes receiving a reference image and a moving image registered to the reference image representing the same object, selecting one or more landmarks in the images, defining a neighborhood in the domain of each image near each selected landmark, extracting feature sets from the neighborhoods for the reference image and the registered moving image, calculating a total quality measure of the registration of the moving image from a distance metric applied to the feature sets extracted from the neighborhoods of the reference image and the registered moving image, comparing the total quality measure to a threshold determined from a reference atlas for the object represented in the image, and determining whether to accept or reject the registration of the moving image based on the comparison result.

10 Claims, 6 Drawing Sheets

SYSTEM AND METHOD FOR VERIFYING REGISTRATION ACCURACY IN DIGITAL MEDICAL IMAGES

CROSS REFERENCE TO RELATED UNITED STATES APPLICATIONS

This application claims priority from "Multiple-steps correlation for verification of registration accuracy with application to Brain MR images", U.S. Provisional Application No. 61/249,740 of Odry, et al., filed Oct. 8, 2009, the contents of which are herein incorporated by reference in their entirety.

TECHNICAL FIELD

This disclosure is directed to the registration of digital medical images.

DISCUSSION OF THE RELATED ART

Image registration is the process of transforming different sets of data into one coordinate system. Registration is necessary in order to be able to compare or integrate the data obtained from these different measurements. Registration usually provides a transformation or deformation field from one set of data, known as the reference volume to one or more other volumes, known as moving volumes. Such process has use in multiple medical applications as it can provide information on the evolution of a patient's disease, by tracking its changes, such as displacement and size, overtime.

Different algorithms can be utilized to perform a registration. Image similarities are broadly used in medical imaging. An image similarity measure quantifies the degree of similarity between intensity patterns in two images. The choice of an image similarity measure depends on the modality of the images to be registered. Common examples of image similarity measures include cross-correlation, mutual information, sum of squared intensity differences, and ratio image uniformity. Mutual information and normalized mutual information are the most popular image similarity measures for registration of multi-modal images. Cross-correlation, sum of squared intensity differences and ratio of image uniformity are commonly used for registration of images in the same modality. In addition, medical image registration often involves nonrigid registration to cope with deformations of the subject, due to breathing, anatomical changes, and so forth. Nonrigid registration can also be used to register a patient's data to an anatomical atlas. There is a level of uncertainty associated with registering images that have any spatiotemporal differences. A confident registration with a measure of uncertainty is critical for many change detection applications such as medical diagnostics.

However, in most cases, the registration returns a transformation field where the correlation between volumes is maximal, but there is no specific information that indicates that indeed the resemblance or matching of the cases is optimum and therefore, validates the quality of the final registration.

SUMMARY OF THE INVENTION

Exemplary embodiments of the invention as described herein generally include methods and systems for verifying registration accuracy based on a resemblance index based on the known anatomy of the cases being registered that allows a user to accept or reject the result of registration.

According to an aspect of the invention, there is provided a method of verifying a registration of a digital image, including receiving a reference image and a moving image that has been registered to the reference image, where the reference image and the moving image are representations of a same object, where each image includes a plurality of intensities defined for a 3D domain of points, selecting one or more landmarks in the images, and defining a neighborhood in the domain of each image near each selected landmark, extracting feature sets from the neighborhoods for the reference image and the registered moving image, calculating a total quality measure of the registration of the moving image from a distance metric applied to the feature sets extracted from the neighborhoods of the reference image and the registered moving image, comparing the total quality measure to a threshold determined from a reference atlas for the object represented in the image, and determining whether to accept or reject the registration of the moving image based on the comparison result.

According to a further aspect of the invention, a symmetry axis is selected in the object represented in the image, and the neighborhoods are defined to be symmetric about the symmetry axis.

According to a further aspect of the invention, the total quality measure is a weighed sum of neighborhood quality measures calculated by applying the distance metric to the feature sets in each neighborhood.

According to a further aspect of the invention, the neighborhood quality measure is $q_i = d(S_{ref}^+(i), S_{mov}^+(i), S_{ref}^-(i), S_{mov}^-(i))$, where d is the distance metric for comparing two sets of data, $S_{mov}^+(i)$ and $S_{mov}^-(i)$ express the features extracted from each landmark i in their respective neighborhoods of the registered moving image on both sides of the symmetry axis, and $S_{ref}^+(i)$ and $S_{ref}^-(i)$ express the features extracted from each landmark i in their respective neighborhoods of the reference image on both sides of the symmetry axis.

According to a further aspect of the invention, the distance metric is a cross correlation calculated over respective neighborhoods of the registered moving image and the reference image.

According to a further aspect of the invention, the distance metric is a sum of squared intensity differences calculated over respective neighborhoods of the registered moving image and the reference image.

According to a further aspect of the invention, the total quality measure is defined as $$QM = \sum_i^n w_i \cdot d(S_{ref}(i), S_{mov}(i)) + \sum_{i,j} w_{ij}^2 \cdot d(S_{mov,j}^+(x_i, y_i, z_i), S_{mov,j}^-(x_i, y_i, z_i)),$$

where d is the distance metric, the first sum is over the neighborhoods, $w_i$ are weights for the neighborhoods, the second sum is over the neighborhoods i for different orientations j about the symmetry axis, $w_{ij}$ are weights for the neighborhoods at orientation j, and sets $S_{mov,j}^+$ and $S_{mov,j}^-$ are subsets of set $S_{mov}(i)$ at orientation j on respective sides of the symmetry axis.

According to a further aspect of the invention, the object is a brain, and the symmetry axis is a mid-sagittal plane.

According to another aspect of the invention, there is provided a method of verifying a registration of a digital image, including receiving a reference image and a moving image that has been registered to the reference image, where the reference image and the moving image are representations of a same object, where each image includes a plurality of intensities defined for a 3D domain of points, selecting a symmetry axis in the object represented in the image, selecting one or more landmarks in the images, and defining a neighborhood in the domain of each image near each selected landmark, and calculating a quality measure QM from $$QM = \sum_i w_i \cdot d(S_{ref}^+(i), S_{mov}^+(i), S_{ref}^-(i), S_{mov}^-(i)),$$

to where the sum is over landmarks, the weights $w_i$ are determined from test data, d is a distance metric for comparing two sets of data, $S_{mov}^+(i)$ and $S_{mov}^-(i)$ express the features extracted from each landmark i in their respective neighborhoods of the registered moving image on either side of the symmetry axis, and $S_{ref}^+(i)$ and $S_{ref}^-(i)$ express the features extracted from each landmark i in their respective neighborhoods of the reference image on either side of the symmetry axis.

According to a further aspect of the invention, the distance metric d is a cross correlation of sets $S_{ref}^+(i)$ and $S_{mov}^+(i)$ and of sets $S_{ref}^-(i)$ and $S_{mov}^-(i)$.

According to a further aspect of the invention, the distance metric d is sum of squared intensity differences of sets $S_{ref}^+(i)$ and $S_{mov}^+(i)$ and of sets $S_{ref}^-(i)$ and $S_{mov}^-(i)$.

According to a further aspect of the invention, the quality measure QM further includes a term $$\sum_{i,j} w_{ij}^2 \cdot d(S_{mov,j}^+(x_i, y_i, z_i), S_{mov,j}^-(x_i, y_i, z_i)),$$

where the sum is over the neighborhoods i for different orientations j about the symmetry axis, $w_{ij}$ are weights for the neighborhoods at orientation j, and sets $S_{mov,j}^+$ and $S_{mov,j}^-$ are subsets of set $S_{mov}(i)$ at orientation j on respective sides of the symmetry axis.

According to a further aspect of the invention, the method includes comparing the quality measure to a threshold determined from a reference atlas for the object represented in the image; and determining whether to accept or reject the registration of the moving image based on the comparison result.

According to a further aspect of the invention, the object is a brain, and the symmetry axis is a mid-sagittal plane.

According to another aspect of the invention, there is provided a program storage device readable by a computer, tangibly embodying a program of instructions executable by the computer to perform the method steps for verifying a registration of a digital image.

DETAILED DESCRIPTION OF EXEMPLARY EMBODIMENTS

Figure 1:
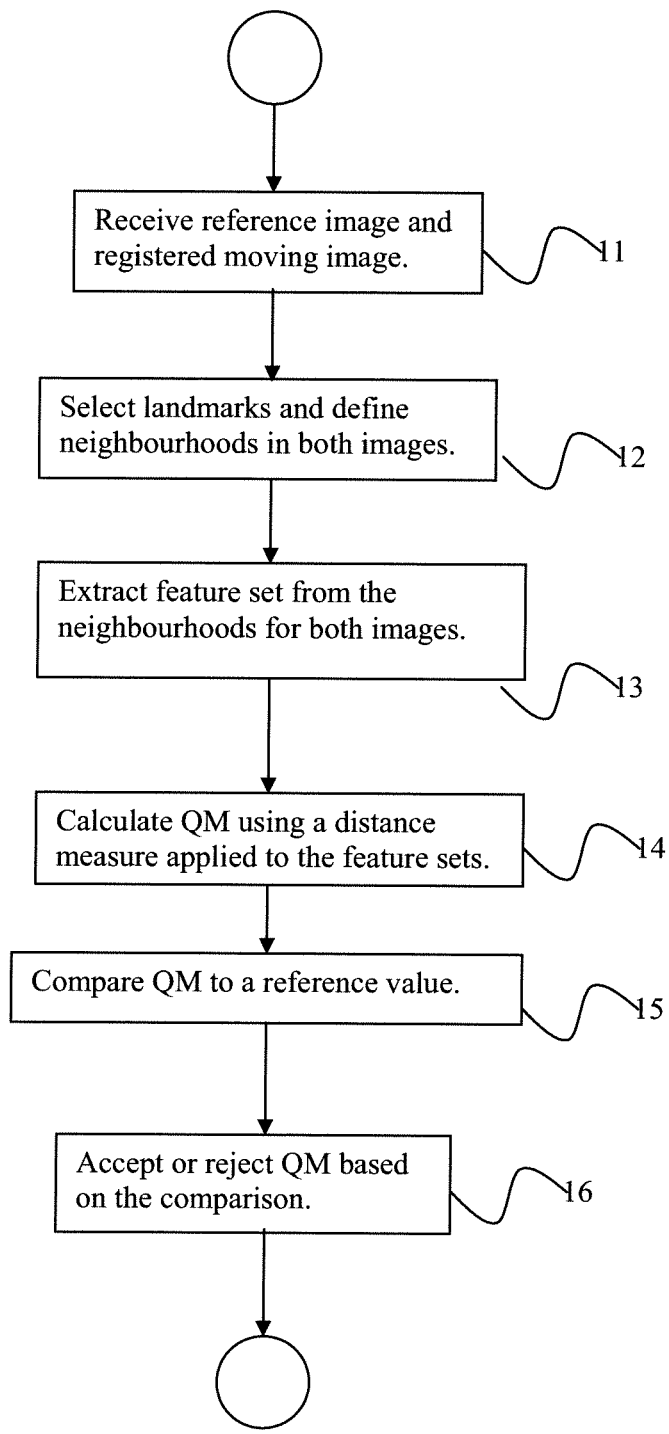
FIG. 1 is a flow chart of a method for verifying registration accuracy, according to an embodiment of the invention.

Exemplary embodiments of the invention as described herein generally include systems and methods for verifying registration accuracy based on a resemblance index computed from the known anatomy of the cases being registered. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R or $R^7$, the methods of the inventions are not limited to such images, and can be applied to images of any dimension, e.g., a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

Exemplary embodiments of the invention will be described herein using 3D MR images of the brain. It is to be understood, however, that these embodiments are non-limiting, and other exemplary embodiments of the invention are applicable to MR images of other parts of the anatomy, and to images acquired using other modalities, such as ultrasound, computed tomography, or positron emission tomography. Returning to the brain of a current embodiment, with knowledge of brain anatomy, a resemblance index can be computed such that it satisfies the brain symmetric characteristics. By annotating prominent symmetric regions of the brain on a reference volume, one can verify that their counterparts on the moving volume display the same symmetric aspects.

A method according to an embodiment of the invention verifies that the geometry of the moving volume fits that of the reference volume after registration. To do this, a landmark or set of landmarks L can be defined by carefully choosing anatomic regions of the brain with specific geometric properties. Afterwards, based on these properties, a set of features $S_{ref}$ are defined for the reference volume and are similarly computed for the moving volume $S_{mov}$. The distance between the two sets of features can then estimate the quality of the registration.

Figure 2:
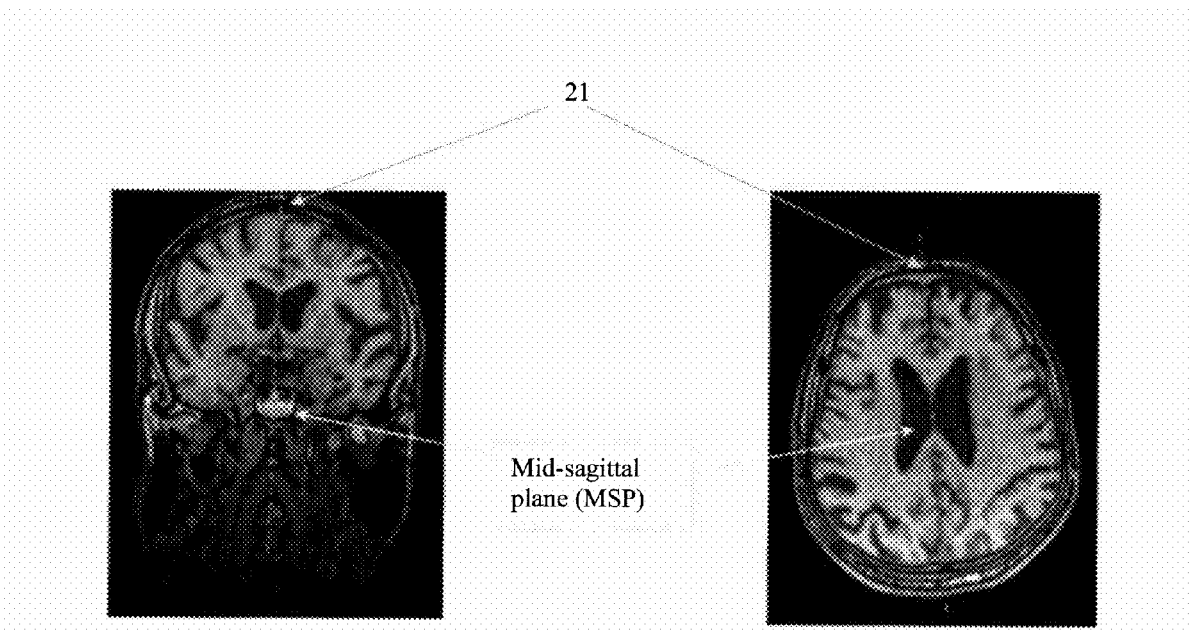
FIG. 2 illustrates proper detection of the mid-sagittal plane (MSP), according to an embodiment of the invention.
Figure 3:
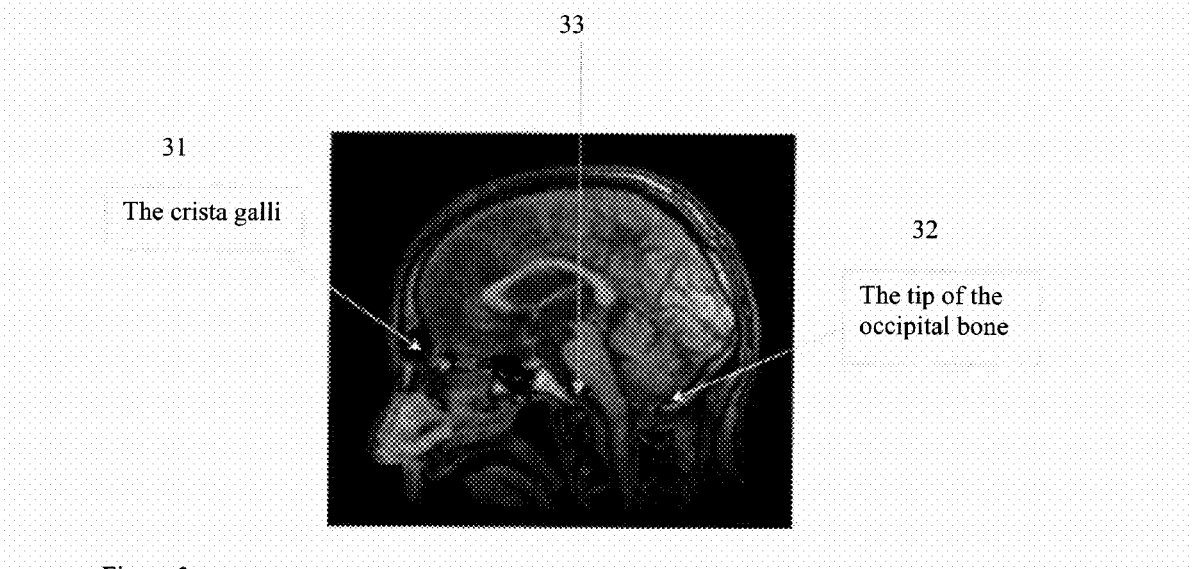
FIG. 3 illustrates proper detection of the Crista-Galli and the tip of the occipital bone (CG-OB), according to an embodiment of the invention.

According to an embodiment of the invention, the definition of a quality measure QM is going to be based on the choice of landmark(s) and the extracted set of features S. Considering that the shape of the brain and/or head can vary depending on the existence of pathologies, the definition of QM should anticipate this situation and use neighborhoods V about the landmarks to compare the set of features from moving to reference volumes. The neighborhoods can be defined based on the landmarks the user sets up. In the case of measuring the symmetry of the brain, the neighborhoods are set to contain relevant anatomic landmarks. The Mid Sagittal Plane (MSP), defined as the plane cutting the brain into two symmetric halves through Cristal-Galli and tip of occipital bone (TOP), can be used as a reference for symmetry, as shown in FIGS. 2 and 3. From this, exemplary landmarks that could be used to validate this symmetry would include the nose, the eyes and their surrounding bone structures, and the ears. Neighborhoods to be compared would be defined accordingly. For example, an initial set of neighborhoods $V^+$, $V^-$, one from each side of the MSP, will contain half the nose, part of the eyes, optical nerves and orbital bones, a second will contain the rest of the eyes, nerves and orbital bones up to the ears, and a third neighborhood would include the ears and background. The size of the neighborhoods may be defined by statistically determined offsets from the mid sagittal plane. However, depending on the landmarks to be targeted, one can have smaller neighborhoods.

Weights can also be associated with neighborhood to emphasize that certain regions of the brain can better detect major shape differences between the two volumes. The weights can be empirically determined using testing data, and will depend on which landmarks are the most reliable. For example, for the brain, the third neighborhood containing the ears mentioned above is not very relevant for monitoring brain tumor changes since it is outside of the brain itself. Therefore, the associated weight would be much smaller.

The definition of QM can then be expressed by:

$$QM = \sum_{i}^{n} w_i \cdot q_i, \quad (1)$$

where the sum is over neighborhoods, $q_i$ is the quality measure in the neighborhood $V_i$ and $w_i$ is the associated weight, $$q_i = d(S_{ref}(i), S_{mov}(i)), \quad (2)$$

where d is any suitable metric for comparing two sets of data, such as a sum of squared intensity differences or a cross-correlation between the two sets of data. The cross correlation between 2 real-valued sets is defined as $$(S_{ref} * S_{mov})[n] = \sum_{m} S_{ref}[m] S_{mov}[n+m],$$

where the sum is over the domain of the sets. Using a sum of squared intensity differences, $q_i$ can be expressed as $$q_i = \int_{V_i^+} (S_{mov}^+(i) - S_{ref}^+(i))^2 dM + \int_{V_i^-} (S_{mov}^-(i) - S_{ref}^-(i))^2 dM \quad (3)$$

where $S_{mov}^+(i)$ and $S_{mov}^-(i)$ express the features extracted from the landmarks in the neighborhood $V_i$, on both (positive and negative) sides of the MSP. More specifically $S_{mov}^{+/-}$ represents the features extracted at the positions given by the transformation of $S_{ref}^{+/-}$ in the atlas, using the deformation field from the registration. $q_i$ actually assesses the difference between the features. dM simply represents the increment over the number of defined landmarks L, which are sets of points $M(x_i, y_i, z_i)$. Using the above neighborhood definition, $S_{mov}^{+/-}$ could target the set of voxels along the orbital bones and/or along the optical nerves. This set of points is generally associated with a distance from the MSP, usually a physical distance, but may also be a signal or intensity distance, such as the intensity distribution of the landmark normalized by the MSP average intensity.

The sets $M(x_i, y_i, z_i)$ may be subsets of $V_i$. The neighborhoods $V_i$ essentially defines the size of the region from which the set of points M are going to be extracted. The size of $V_i$ is going to be the same on both side of the symmetry axis, and can physically be identified as $V_i^+$ and $V_i^-$ depending on the side of the axis. For each $V_i^+$ and $V_i^-$, there is a corresponding set of point M that is used to compute QM.

In addition, based on the landmark that is chosen, the symmetry of the data with respect to the landmark can also be added to QM along any or multiple directions across layers. QM then becomes:

$$QM = \sum_{i}^{n} w_i \cdot q_i + \sum_{i,j} w_{ij}^2 \cdot d(S_{mov,j}^+(x_i, y_i, z_i), S_{mov,j}^-(x_i, y_i, z_i)) \quad (4)$$

$$= \sum_{i}^{n} w_i \cdot d(S_{ref}(i), S_{mov}(i)) + \sum_{i,j} w_{ij}^2 \cdot$$

$$d(S_{mov,j}^+(x_i, y_i, z_i), S_{mov,j}^-(x_i, y_i, z_i)),$$

where $w_{ij}$ is the weight assigned to the neighborhood $V_i$ and orientation j and $S_{mov,j}^+$ and $S_{mov,j}^-$ indicate the positive and negative orientations with respect to the landmark. The sets S+ and S− are the sets of points on each side of the symmetry axis. According to an embodiment of the invention, the symmetry axis is the MSP, S+ is the right hand side and S− is the left hand side. Similarly, in other embodiments of the invention, the axial and coronal planes can be used as the symmetry axis, hence the QMs may be calculated with respect to any or multiple directions. The quality of the registration is then defined by the judgment of QM against a predefined threshold value that could be obtained statistically on a substantially large set of data, such as an anatomical atlas.

FIG. 1 is a flowchart of a method of verifying registration accuracy, according to an embodiment of the invention. A method starts at step 11 by receiving a reference image $I_{ref}(x)$ and a moving image, $I_{mov}(T(x))$, registered to said reference image, where x is a point in the 3D image domain. Next, at step 12, one or more landmarks L are defined by choosing anatomic regions of the brain with specific geometric properties, and the landmarks are used to define image neighborhoods V near the landmarks, and optionally including the landmarks. Based on these properties, feature sets $S_{ref}$ and $S_{mov}$ are extracted from the neighborhoods at step 13 for the reference volume and moving volume, respectively. Once the landmarks, neighborhoods, and feature sets have been defined, the quality measure QM can be calculated at step 14 from EQ. (4) using the metrics defined above. The QM result is then compared at step 15 with a threshold obtained from an anatomical atlas, to determine whether to accept or reject the registration at step 16. Although an exemplary embodiment has been described for the case of brain MR images, embodiments of the invention are not limited thereto, those of ordinary skill in the art can readily apply methods disclosed herein to verifying the registration of other anatomical objects and to verifying images acquired through other imaging modalities.

EXAMPLE

In an example according to an embodiment of the invention, the Mid-Sagittal Plane (MSP), which separates the brain along its two hemispheres, was chosen as an axis of symmetry. The MSP is defined to go through two main landmarks of the brain, the Crista-Gall (CG) and the tip of the occipital bone (TOB). FIG. 2 illustrates a proper detection of the mid-sagittal plane (MSP) 21, and FIG. 3 illustrates a proper detection of the Crista-Galli 31 and the tip of the occipital bone 32 (CG-OB). The dashed line 33 connecting the Crista-Galli 31 and the tip of the occipital bone 32 represents the mid-sagittal plane. A symmetrized dataset was selected as the reference volume into which to map the MSP, using a set of points that matches specific landmarks within the MSP.

Now that the landmark or set of landmarks has been established, one can define a measure to use to verify the quality of the registration. According to an embodiment of the invention, one seeks to verify that the shape of the heads matches, so the geometric measure is defined as the brain voxel quantity on both sides of the MSP as a function of the distance from the MSP. This could be obtained by computing a histogram of the volumes and addressing the number of points per column. One can also define layers as portions of the maximum distance from the volume boundaries to the MSP. This will allow comparing the shape of the brain closer to, as well as increasingly farther from, the MSP.

Figure 4:
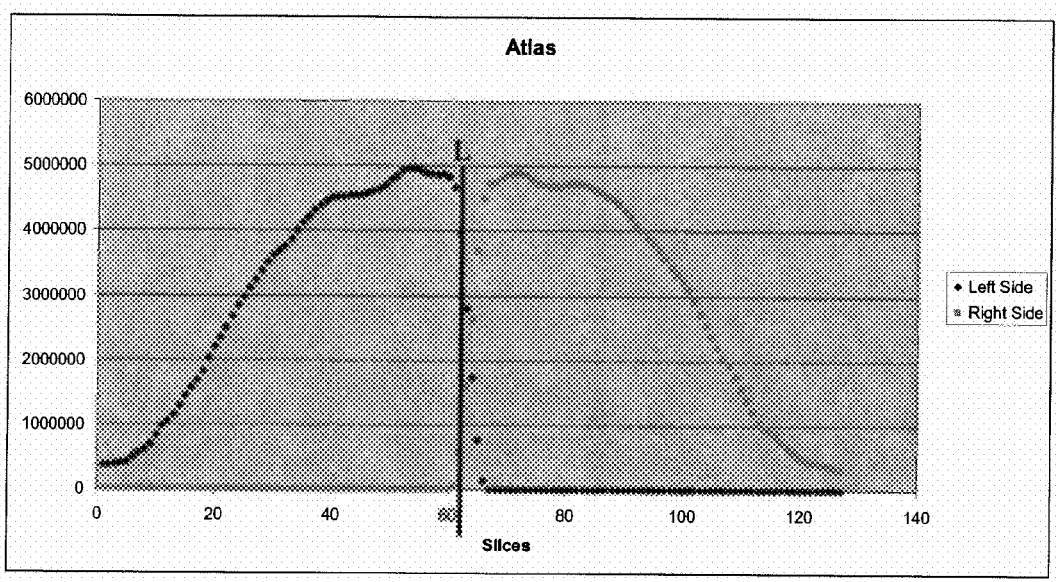
FIG. 4 graphs the number of extracted features as a function of slice for a reference volume, according to an embodiment of the invention.

FIGS. 4 to 8 illustrate the computation of the voxel distributions for the reference volume and 2 moving volumes. FIG. 4 graphs the number of extracted features in a reference volume, such as an atlas, as a function of slice from left to right through the MSP, indicated by reference letter L. The graph illustrates the symmetry of the left and right sides of the brain with respect to the MSP.

Figure 5:
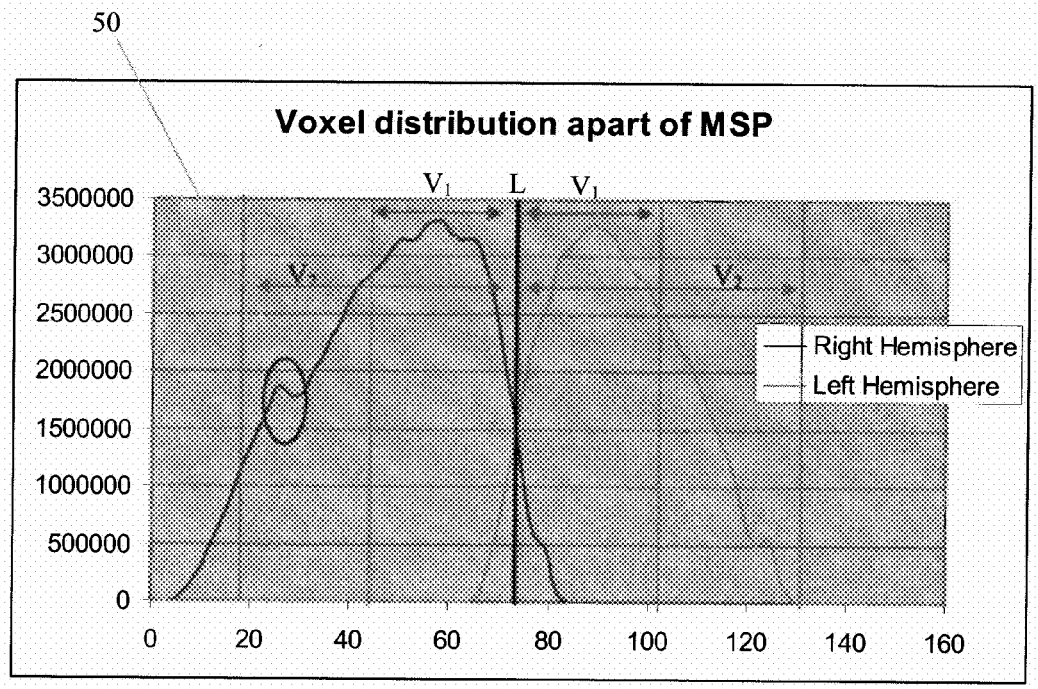
FIG. 5 graphs the number of extracted features for a moving volume acquired from a patient with a tumor, according to an embodiment of the invention.

FIG. 5 graphs the number of extracted features for a moving volume acquired from a patient with a tumor as a function of slice from left to right through the MSP, indicated by reference letter L. The references letters $V_1$ and $V_2$ indicate slices belonging to preset neighborhoods, and the circled region 50 corresponds to a tumor on the MPR in FIG. 6. The neighborhood V1 and V2 allow one to obtain a positive detection in spite of the prominent shape of the tumor that deforms the head in FIG. 6.

Figure 6:
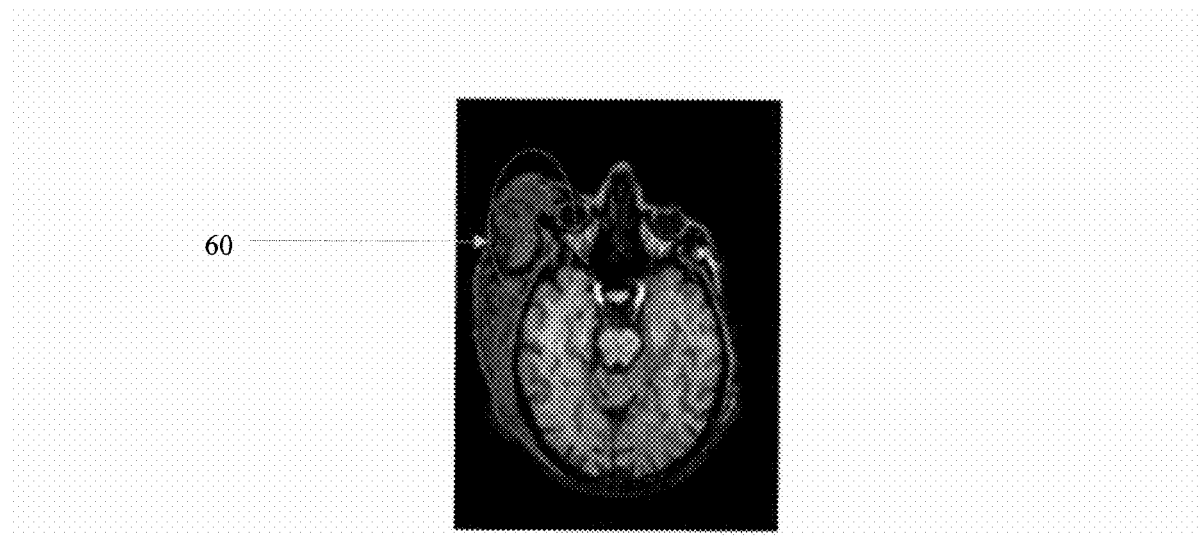
FIG. 6 depicts an associated MPR image of the graph from FIG. 5, according to an embodiment of the invention.

FIG. 6 depicts the associated multi-planar reformatting (MPR) image of the graph from FIG. 5, showing the circled tumor 60. The computation of the QM enables the detection of a bump in FIG. 5, corresponding to a tumor on FIG. 6, while still verifying the registration.

Figure 7:
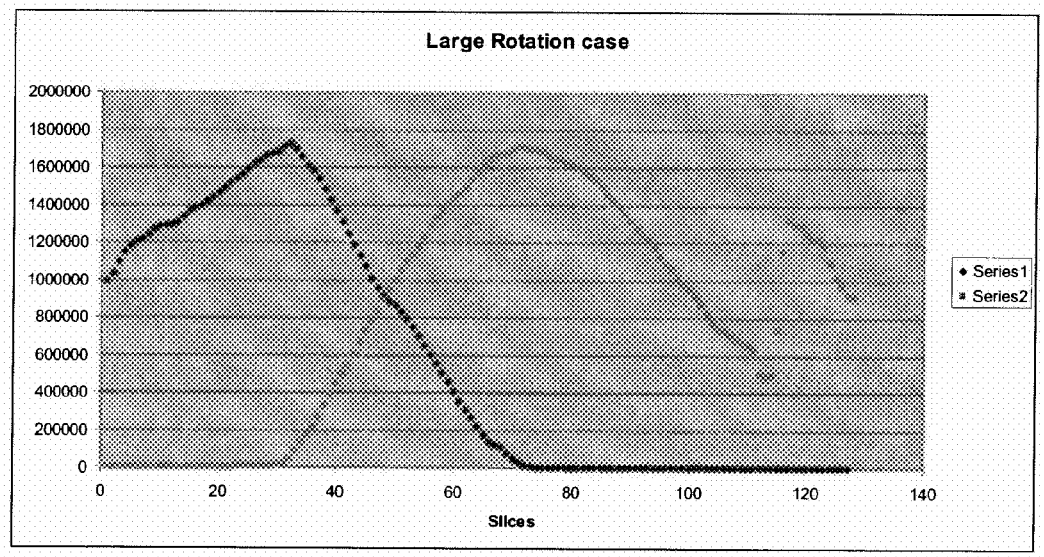
FIG. 7 graphs the number of extracted features for a badly registered moving volume, according to an embodiment of the invention.
Figure 8:
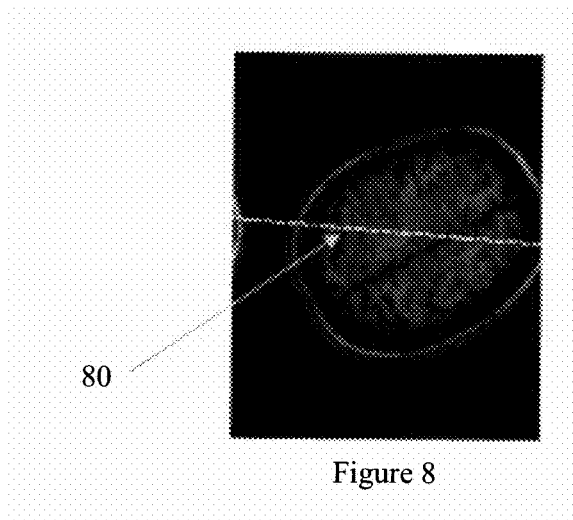
FIG. 8 depicts the MSP associated with the graphs of FIG. 7, according to an embodiment of the invention.

FIG. 7 graphs the number of extracted features for a badly registered moving volume as a function of slice from left to right through the MSP, and how the extracted features are related. FIG. 8 depicts the associated MPR for this bad registration. The mapped MSP is represented by the line 80, which is rotated with respect to the symmetry axis of the moving volume. At first glance, there is no symmetry between hemispheres as shown in FIG. 8. However, the derived QM correctly detects this as a wrong registration so the user can proceed accordingly.

System Implementations

It is to be understood that embodiments of the present invention can be implemented in various foil is of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 9:
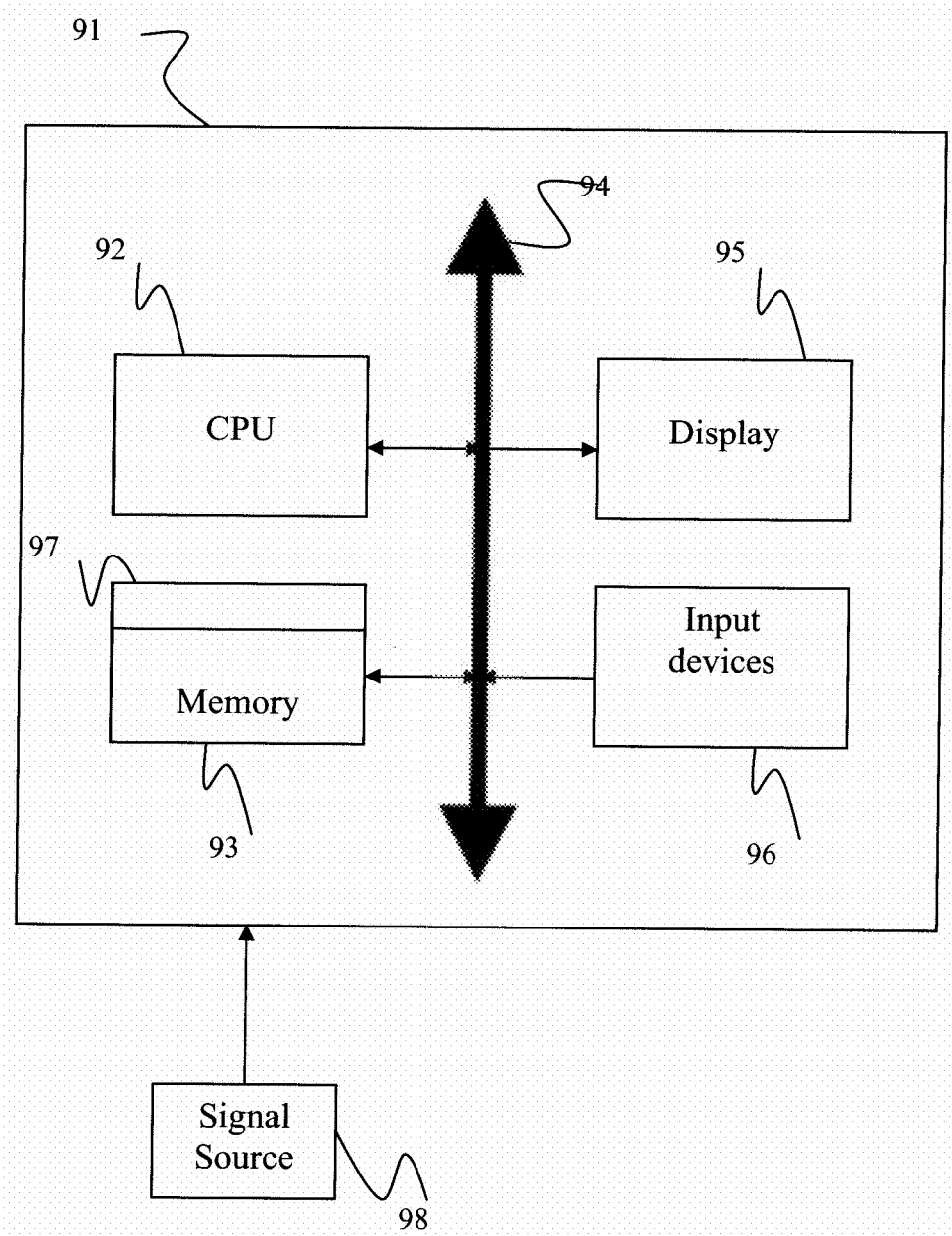
FIG. 9 is a block diagram of an exemplary computer system for implementing a method for verifying registration accuracy based on a resemblance index computed from the known anatomy of the cases being registered, according to an embodiment of the invention.

FIG. 9 is a block diagram of an exemplary computer system for implementing a method for verifying registration accuracy based on a resemblance index computed from the known anatomy of the cases being registered, according to an embodiment of the invention. Referring now to FIG. 9, a computer system 91 for implementing the present invention can comprise, inter alia, a central processing unit (CPU) 92, a memory 93 and an input/output (I/O) interface 94. The computer system 91 is generally coupled through the I/O interface 94 to a display 95 and various input devices 96 such as a mouse and a keyboard. The support circuits can include circuits such as cache, power supplies, clock circuits, and a communication bus. The memory 93 can include random access memory (RAM), read only memory (ROM), disk drive, tape drive, etc., or a combinations thereof. The present invention can be implemented as a routine 97 that is stored in memory 93 and executed by the CPU 92 to process the signal from the signal source 98. As such, the computer system 91 is a general purpose computer system that becomes a specific purpose computer system when executing the routine 97 of the present invention.

The computer system 91 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to exemplary embodiments, those skilled in the art will appreciate that various modifications and substitutions can be made thereto without departing from the spirit and scope of the invention as set forth in the appended claims.

What is claimed is:

1. A method of verifying a registration of a digital image, said method comprising the steps of:

receiving a reference image and a moving image that has been registered to said reference image, wherein said reference image and said moving image are representations of a same object, wherein each said image comprises a plurality of intensities defined for a three-dimensional (3D) domain of points;

selecting a symmetry axis in the object represented in the image;

selecting one or more landmarks in said images, and defining a neighborhood in the domain of each image near each selected landmark, said neighborhoods defined to be symmetric about said symmetry axis;

extracting feature sets from the neighborhoods for the reference image and the moving image;

calculating a total quality measure of the registration of the moving image from a distance metric applied to the feature sets extracted from the neighborhoods of the reference image and the registered moving image, wherein said total quality measure is a weighed sum of neighborhood quality measures calculated by applying the distance metric to said feature sets in each neighborhood defined as $$q_i = d(S_{ref}^+(i), S_{mov}^+(i), S_{ref}^-(i), S_{mov}^-(i)),$$

wherein d is the distance metric for comparing two sets of data, $S_{mov}^+(i)$ and $S_{mov}^-(i)$ express the features extracted from each landmark i in their respective neighborhoods of said registered moving image on both sides of the symmetry axis, and $S_{ref}^+(i)$ and $S_{ref}^-(i)$ express the features extracted from each landmark i in their respective neighborhoods of said reference image on both sides of the symmetry axis;

comparing the total quality measure to a threshold determined from a reference atlas for the object represented in the image; and determining whether to accept or reject the registration of the moving image based on the comparison result.

2. The method of claim 1, wherein said distance metric is a cross correlation calculated over respective neighborhoods of the registered moving image and the reference image.

3. The method of claim 1, wherein said distance metric is a sum of squared intensity differences calculated over respective neighborhoods of the registered moving image and the reference image.

4. The method of claim 1, wherein said total quality measure is defined as $$QM = \sum_i^n w_i \cdot d(S_{ref}(i), S_{mov}(i)) + \sum_{i,j} w_{ij}^2 \cdot d(S_{mov,j}^+(x_i, y_i, z_i), S_{mov,j}^-(x_i, y_i, z_i)),$$

wherein d is said distance metric, the first sum is over the neighborhoods, $w_i$ are weights for the neighborhoods, the second sum is over the neighborhoods i for different orientations j about said symmetry axis, $w_{ij}$ are weights for the neighborhoods at orientation j, and sets $S_{mov,j}^+$ and $S_{mov,j}^-$ are subsets of set $S_{mov}(i)$ at orientation j on respective sides of the symmetry axis.

5. The method of claim 1, wherein said object is a brain, and said symmetry axis is a mid-saggital plane.

6. A non-transitory program storage device readable by a computer, tangibly embodying a program of instructions executable by the computer to perform the method steps for verifying a registration of a digital image, said method comprising the steps of:

receiving a reference image and a moving image that has been registered to said reference image, wherein said reference image and said moving image are representations of a same object, wherein each said image comprises a plurality of intensities defined for a three-dimensional (3D) domain of points;

selecting a symmetry axis in the object represented in the image;

selecting one or more landmarks in said images, and defining a neighborhood in the domain of each image near each selected landmark, said neighborhoods defined to be symmetric about said symmetry axis;

extracting feature sets from the neighborhoods for the reference image and the moving image;

calculating a total quality measure of the registration of the moving image from a distance metric applied to the feature sets extracted from the neighborhoods of the reference image and the registered moving image, wherein said total quality measure is a weighed sum of neighborhood quality measures calculated by applying the distance metric to said feature sets in each neighborhood defined as $$q_i = d(S_{ref}^+(i), S_{mov}^+(i), S_{ref}^-(i), S_{mov}^-(i)),$$

wherein d is the distance metric for comparing two sets of data, $S_{mov}^+(i)$ and $S_{mov}^-(i)$ express the features extracted from each landmark i in their respective neighborhoods of said registered moving image on both sides of the symmetry axis, and $S_{ref}^+(i)$ and $S_{ref}^-(i)$ express the features extracted from each landmark i in their respective neighborhoods of said reference image on both sides of the symmetry axis;

comparing the total quality measure to a threshold determined from a reference atlas for the object represented in the image; and determining whether to accept or reject the registration of the moving image based on the comparison result.

7. The computer readable program storage device of claim 6, wherein said distance metric is a cross correlation calculated over respective neighborhoods of the registered moving image and the reference image.

8. The computer readable program storage device of claim 6, wherein said distance metric is a sum of squared intensity differences calculated over respective neighborhoods of the registered moving image and the reference image.

9. The computer readable program storage device of claim 6, wherein said total quality measure is defined as $$QM = \sum_i^n w_i \cdot d(S_{ref}(i), S_{mov}(i)) + \sum_{i,j} w_{ij}^2 \cdot d(S_{mov,j}^+(x_i, y_i, z_i), S_{mov,j}^-(x_i, y_i, z_i)),$$

wherein d is said distance metric, the first sum is over the neighborhoods, $w_i$ are weights for the neighborhoods, the second sum is over the neighborhoods i for different orientations j about said symmetry axis, $w_{ij}$ are weights for the neighborhoods at orientation j, and sets $S_{mov,j}^+$ and $S_{mov,j}^-$ are subsets of set $S_{mov}(i)$ at orientation j on respective sides of the symmetry axis.

10. The computer readable program storage device of claim 6 wherein said object is a brain, and said symmetry axis is a mid-saggital plane.

* * * * *